US011750017B2

(12) United States Patent
Hung

(10) Patent No.: US 11,750,017 B2
(45) Date of Patent: Sep. 5, 2023

(54) PROJECTION SYSTEM AND WIRELESS CHARGING METHOD OF PROJECTION SYSTEM

(71) Applicant: Coretronic Corporation, Hsin-Chu (TW)

(72) Inventor: Hui-Chung Hung, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/984,178

(22) Filed: Aug. 4, 2020

(65) Prior Publication Data
US 2021/0044134 A1 Feb. 11, 2021

(30) Foreign Application Priority Data
Aug. 5, 2019 (CN) .......................... 201910716367.6

(51) Int. Cl.
| | |
|---|---|
| *G06F 3/0482* | (2013.01) |
| *H02J 7/04* | (2006.01) |
| *G08B 5/36* | (2006.01) |
| *H02J 50/80* | (2016.01) |
| *H02J 50/10* | (2016.01) |
| *H04M 1/72409* | (2021.01) |
| *H02J 7/00* | (2006.01) |
| *H04M 1/02* | (2006.01) |

(52) U.S. Cl.
CPC .............. *H02J 7/04* (2013.01); *G06F 3/0482* (2013.01); *G08B 5/36* (2013.01); *H02J 50/10* (2016.02); *H02J 50/80* (2016.02); *H04M 1/72409* (2021.01); *H02J 7/00711* (2020.01); *H04M 1/0272* (2013.01)

(58) Field of Classification Search
CPC ...... G06F 3/0482; G06F 3/0484; G06F 3/042; H02J 7/04; H02J 50/80; H02J 7/00711; G08B 5/36
See application file for complete search history.

(56) References Cited

U.S. PATENT DOCUMENTS

| | | | | |
|---|---|---|---|---|
| 2019/0123591 A1* | 4/2019 | Azam | ..................... | H02J 50/80 |
| 2019/0204990 A1* | 7/2019 | Kaneda | ................. | A63F 13/213 |
| 2019/0393734 A1* | 12/2019 | Zhou | .................... | H04B 5/0037 |

FOREIGN PATENT DOCUMENTS

| | | |
|---|---|---|
| CN | 102636939 A | 8/2012 |
| CN | 202957914 U | 5/2013 |
| CN | 104283328 A | 1/2015 |
| JP | 2009205050 A | 9/2009 |

(Continued)

*Primary Examiner* — Robert J Michaud

(57) ABSTRACT

A projection system includes a power supply device, a wireless charging transmission device, a projection system control assembly, a storage unit, and an optical system. The projection system control assembly controls a light valve thereof to convert illumination beam into image beam. A projection lens thereof projects the image beam to be a projection image. A user operation information is stored in the storage unit. The projection image includes an operation menu related to the user operation information. The projection system control assembly turns on or turns off the wireless charging transmission device according to the user operation information to wirelessly charge electronic device. A wireless charging method of the projection system is also provided.

11 Claims, 7 Drawing Sheets

(56) References Cited

FOREIGN PATENT DOCUMENTS

| TW | 200734799 | A  |   | 9/2007 |           |
|----|-----------|----|---|--------|-----------|
| TW | M453869   | U  | * | 5/2013 | G03B 21/00 |
| TW | M453869   | U1 |   | 5/2013 |           |

* cited by examiner

M4 — Turn on charging tip of wireless charging ☐

FIG. 6A

M5 — Turn on charging tip of wireless charging ☑

FIG. 6B

M6 — Turn on charging tip of wireless charging ☐

FIG. 6C

PROJECTION SYSTEM AND WIRELESS CHARGING METHOD OF PROJECTION SYSTEM

CROSS-REFERENCE TO RELATED APPLICATION

This application claims the priority benefit of China application CN201910716367.6, filed on Aug. 5, 2019. The entirety of the above-mentioned patent application is hereby incorporated by reference herein and made a part of this specification.

FIELD OF THE INVENTION

The invention relates to a projection system and a charging method thereof, and more particularly to a projection system and a wireless charging method of the projection system.

BACKGROUND OF THE INVENTION

The purpose of a projection system lies in projecting dynamic or static images in mobile electronic devices such as tablet computers and mobile phones for presentations or viewing activities. However, the power source of a mobile electronic device usually relies on its own battery. When the battery is low, an external charging cable is needed to charge the battery. Since the connector of the charging cable applied for the mobile electronic device usually has a specific specification, if the appropriate charging cable is not carried, the mobile electronic device will not be able to project through the projection system due to low battery, affecting the presentation or viewing activities. Although the current mobile electronic devices may already have a built-in wireless charging receiving device, so that the mobile electronic devices may be charged through the wireless charging manner, the external wireless charging transmission devices for charging the mobile electronic devices are all independent devices. If there is no external wireless charging transmission device provided at the presentations or viewing activities, the mobile electronic device cannot be charged through the wireless charging manner. Therefore, when a projection system is used with a mobile electronic device to perform a presentation or viewing activity, the prior art has a problem that it is difficult to perform a presentation or viewing activity because it is difficult to provide a suitable charging device or equipment.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a projection system and a wireless charging method of the projection system, which can provide power for an electronic device to facilitate the presentations or viewing activities.

Other advantages and objects of the invention may be further illustrated by the technical features broadly embodied and described as follows.

In order to achieve one or a portion of or all of the objects or other objects, the projection system provided by the invention includes a power supply device, a wireless charging transmission device, a projection system control assembly, a storage unit, and an optical system. The projection system control assembly is electrically connected to the wireless charging transmission device and the storage unit. The projection system control assembly turns on or turns off the wireless charging transmission device according to user operation information stored in the storage unit. The wireless charging transmission device includes a communication control assembly, a coil, and a driving circuit. The driving circuit is electrically connected to the power supply device. The communication control assembly controls the driving circuit to provide a driving current to the coil according to a device charging information received via the coil when the wireless charging transmission device is turned on, so as to wirelessly charge an electric device. The optical system is electrically connected to the projection system control assembly, and the optical includes a light source, a light valve, and a projection lens. The light source provides an illumination beam. The light valve is disposed on a transmission path of the illumination beam. The projection system control assembly controls the light valve to convert the illumination beam into an image beam. The projection lens is disposed on a transmission path of the image beam to project the image beam to be a projection image. The projection image includes an operation menu related to the user operation information. The power supply device provides power for the wireless charging transmission device, the projection system control assembly, and the optical system.

In order to achieve one or a portion of or all of the objects or other objects, the wireless charging method of the projection system provided by the invention is adapted for the projection system including a power supply device, a wireless charging transmission device, a projection system control assembly, a storage unit, and an optical system. The projection system control assembly is electrically connected to the wireless charging transmission device, the storage unit, and the optical system. The wireless charging transmission device includes a communication control assembly, a coil, and a driving circuit, and the driving circuit is electrically connected to the power supply device. The optical system includes a light source, a light valve, and a projection lens. The light provides an illumination beam. The light valve is disposed on a transmission path of the illumination beam. The projection system control assembly controls the light valve to convert the illumination beam into an image beam. The projection lens is disposed on a transmission path of the image beam to project the image beam to be a projection image. The power supply device provides power for the wireless charging device, the projection system control assembly, and the optical system. The projection image includes an operation menu related to user operation information. The user operation information is stored in the storage unit. The wireless charging method of the projection system includes: a step that the projection system control assembly turns on or turns off the wireless charging transmission device according to the user operation information stored in the storage unit; and a step that the communication control assembly controls the driving circuit to provide a driving current to the coil according to a device charging information received via the coil when the wireless charging transmission device is turned on, so as to wirelessly charge an electronic device.

In the projection system and the wireless charging method of the projection system of the invention, since the projection system control assembly turns on or turns off the wireless charging transmission device according to the user operation information stored in the storage unit, and the communication control assembly controls the driving circuit to provide the driving current to the coil according to the device charging information received via the coil when the wireless charging transmission device is turned on to wirelessly charge the electronic device, the projection system and the wireless charging method of the projection system of the invention can provide power for the electronic device in time to facilitate the presentations or viewing activities.

Other objectives, features and advantages of The invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6A is a schematic diagram of an operation menu of a wireless charging tip message projected by a projection system in accordance with an embodiment of the invention;

FIG. 6B is a schematic diagram of an operation menu of a wireless charging tip message projected by a projection system in accordance with an embodiment of the invention after a user selects to turn on the wireless charging tip message;

FIG. 6C is a schematic diagram of an operation menu of a wireless charging tip message projected by a projection system in accordance with an embodiment of the invention after a user selects to turn off the wireless charging tip message.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
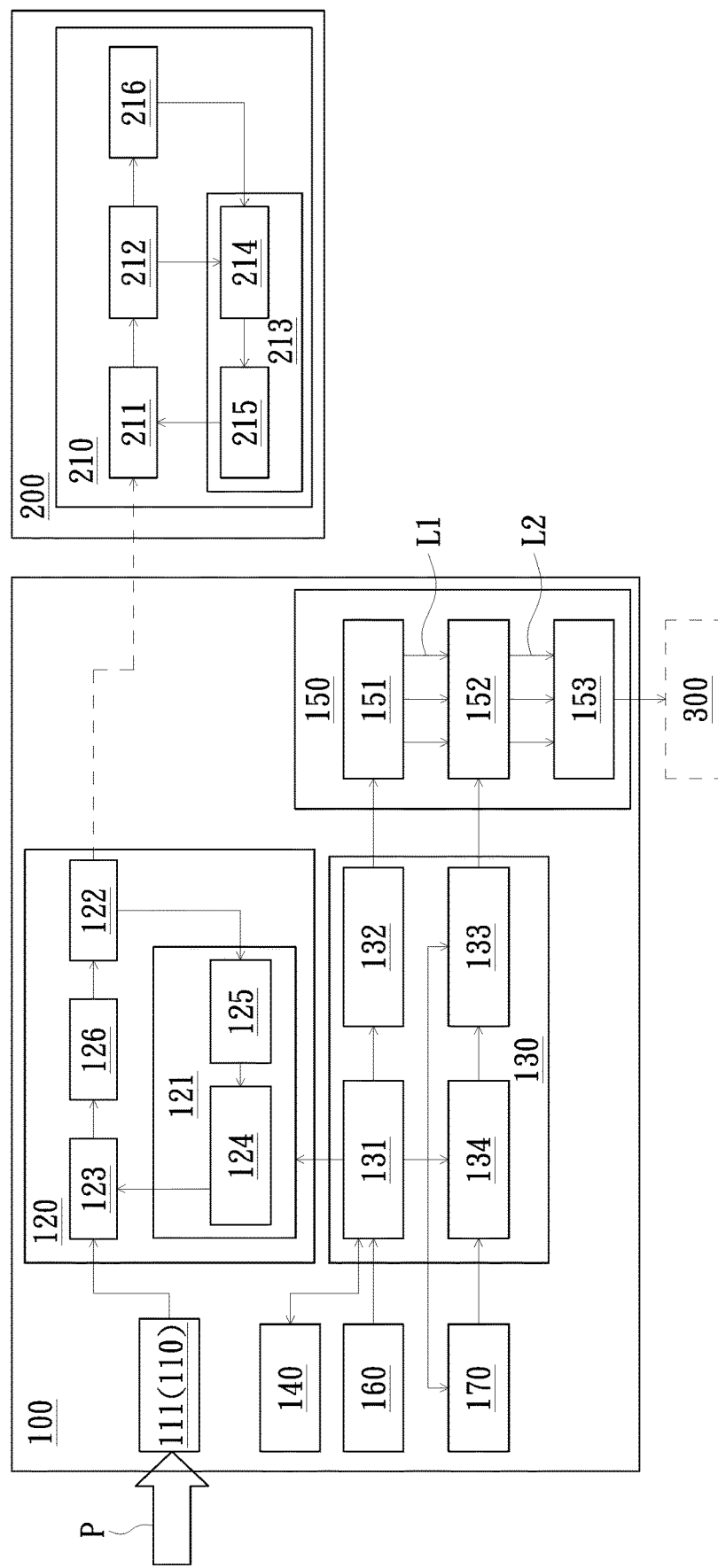
FIG. 1 is a functional block diagram of a mobile electronic device and a projection system in accordance with an embodiment of the invention.
Figure 2:
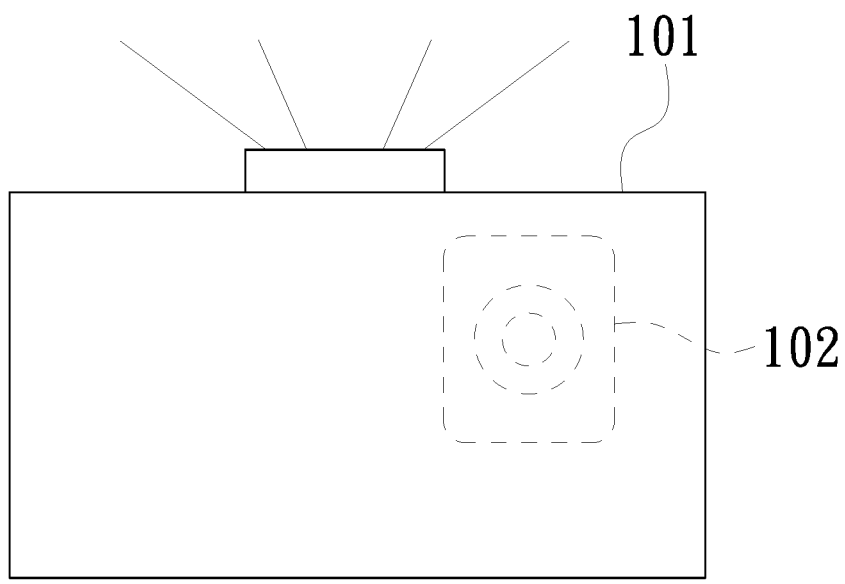
FIG. 2 is a schematic appearance of a projection system in accordance with an embodiment of the invention.
Figure 3A:
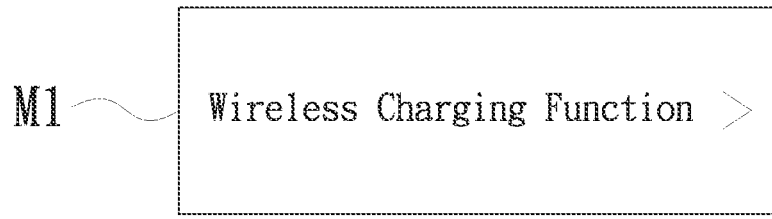
FIG. 3A is a schematic diagram of an operation menu of a wireless charging function projected by a projection system in accordance with an embodiment of the invention.
Figure 3B:
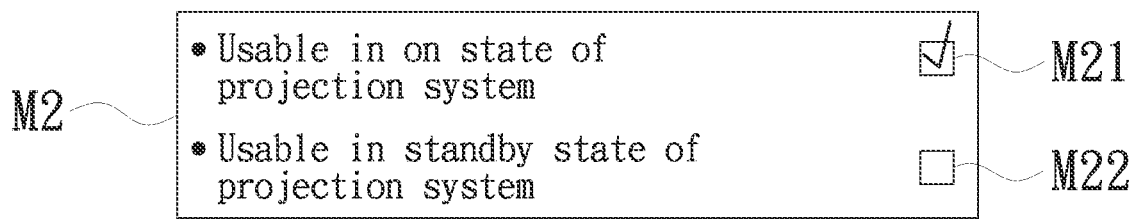
FIG. 3B is a schematic diagram of an operation menu of a wireless charging function projected by a projection system in accordance with an embodiment of the invention after a user selects to turn on the wireless charging function.
Figure 3C:
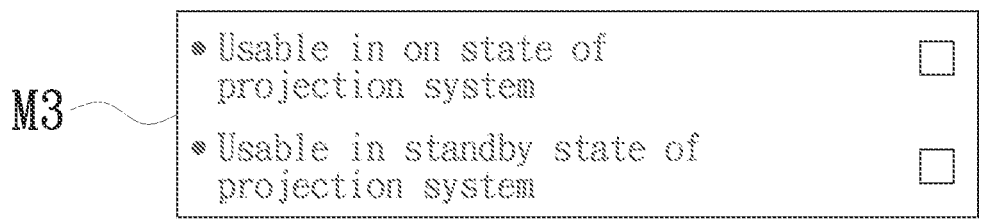
FIG. 3C is a schematic diagram of an operation menu of a wireless charging function projected by a projection system in accordance with an embodiment of the invention after a user selects to turn off the wireless charging function.
Figure 4:
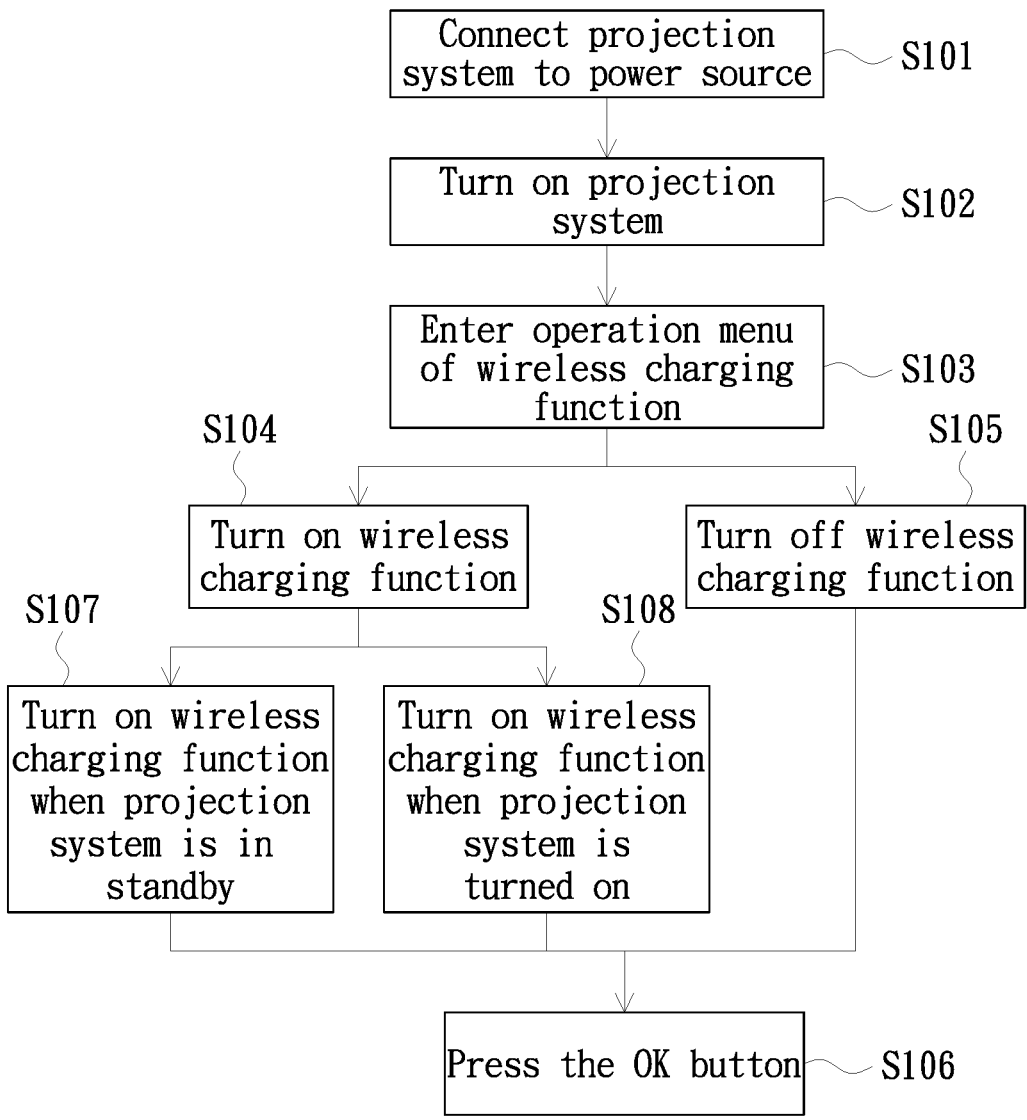
FIG. 4 is a user operation setting flow chart of a projection system in accordance with an embodiment of the invention.

FIG. 1 is a functional block diagram of a mobile electronic device 200 and a projection system 100 in accordance with an embodiment of the invention. FIG. 2 is a schematic appearance of a projection system 100 in accordance with an embodiment of the invention. FIG. 3A is a schematic diagram of an operation menu M1 of a wireless charging function projected by a projection system 100 in accordance with an embodiment of the invention. FIG. 3B is a schematic diagram of an operation menu M2 of a wireless charging function projected by a projection system 100 in accordance with an embodiment of the invention after a user selects to turn on the wireless charging function. FIG. 3C is a schematic diagram of an operation menu M3 of a wireless charging function projected by a projection system 100 in accordance with an embodiment of the invention after a user selects to turn off the wireless charging function. FIG. 4 is a user operation setting flow chart of a projection system 100 in accordance with an embodiment of the invention. Referring FIGS. 1 to 4, the projection system 100 of the embodiment includes a power supply device 110, a wireless charging transmission device 120, a projection system control assembly 130, a storage unit 140, and an optical system 150. The projection system control assembly 130 is electrically connected to the wireless charging transmission device 120 and the storage unit 140. The wireless charging transmission device 120 includes a communication control assembly 121, a coil 122, and a driving circuit 123. The driving circuit 123 is electrically connected to the power supply device 110. The optical system 150 is electrically connected to the projection system control assembly 130. The optical system 150 includes a light source 151, a light valve 152, and a projection lens 153. The light source 151 provides an illumination beam L1. The light valve 152 is disposed on a transmission path of the illumination beam L1. The projection system control assembly 130 controls the light valve 152 to convert the illumination beam L1 into an image beam L2. The projection lens 153 is disposed on a transmission path the image beam L2 to project the image beam L2 to be a projection image. The power supply device 110 provides power for the wireless charging transmission device 120, the projection system control assembly 130, and the optical system 150. The storage unit 140 stores user operation information. The projection image includes operation menus M1, M2, M3 related to the user operation information. The projection system control assembly 130 turns on or turns off the wireless charging transmission device 120 according to the user operation information stored in the storage unit 140. The communication control assembly 121 receives device charging information from the electronic device 200 via the coil 122 when the wireless charging transmission device 120 is turned on, and controls the driving circuit 123 according to the device charging information received, causing the driving circuit 123 to provide a driving current to the coil 122, so as to wirelessly charge the electronic device 200. In addition, the electronic device 200 is, for example, a mobile phone, a tablet computer, etc, having a wireless charging receiving device, but is not limited thereto.

The interoperability between the wireless charging receiving device 210 of the electronic device 200 and the wireless charging transmission device 120 of the projection system 100 can follow the wireless charging standard of Wireless Power Consortium (WPC), Alliance for Wireless Power (A4WP) or Power Matters Alliance (PMA). In the embodiment, the interoperability between the wireless charging receiving device 210 of the electronic device 200 and the wireless charging transmission device 120 of the projection system 100 is established according to the wireless charging standard of Wireless Power Consortium, but the invention is not limited thereto. Further, the wireless charging receiving device 210 of the electronic device 200 can include a coil 211, a rectification and voltage regulation circuit 212, and a communication control assembly 213. The communication control assembly 213 of the wireless charging receiving device 210 includes a receiving end control unit 214 and a modulation circuit 215. The communication control assembly 121 of the wireless charging transmission device 120 can include a transmission end control unit 124 and a demodulation circuit 125. The power supply device 110 can output power to the driving circuit 123. When the wireless charging transmission device 120 is turned on, the transmission end control unit 124 can transmit pulse width modulation (PWM) information to the driving circuit 123, causing the driving circuit 123 to provide the driving circuit to the coil 122, so as to generate the magnetic force. When the coil 211 of the wireless charging receiving device 210 of the electronic device 200 and the coil 122 of the wireless charging transmission device 120 of the projection system 100 are coupled, the power can be transmitted from the coil 122 of the projection system 100 to the coil 211 of the electronic device 200 for wireless charging, so as to charge the rechargeable battery 216. Specifically, the receiving end control unit 214 can transmit pulse width modulation information to the modulation circuit 215 according to the device charging information. The modulation circuit 215 can provide a driving circuit to the coil 211 according to the pulse width modulation information. After the two coils 122, 211 are coupled, the receiving end control unit 214 and the modulation circuit 215 can transmit the device charging information to the demodulation circuit 125 of the communication control assembly 121 via the coil 211 of the wireless charging receiving device 210 and the coil 122 of the wireless charging transmission device 120 for analysis. The device charging information may include the information such as the remaining power amount of the rechargeable battery of the electronic device 200, the actually received charging current value or/and the required charging current value. The transmission end control unit of the communication control assembly 121 can control the driving circuit 123 according to the device charging information, so as to provide a suitable driving current to the coil 122, and thereby wirelessly charging the electronic device 200.

The communication control assembly 121 of the wireless charging transmission device 120 can demodulate the device charging information and generate the pulse width modulation information. The driving circuit 123 provides the driving current to the coil 122 according to the pulse width modulation information, so as to wirelessly charge the electronic device 200. In the embodiment, the demodulation circuit 125 of the communication control assembly 121 of the wireless charging transmission device 120 may analysis the device charging information by demodulation, filtering, shaping and other circuit analysis methods. The transmission end control unit 124 can generate corresponding pulse width modulation (PWM) information to the driving circuit 123 according to the analyzed device charging information. In addition, the wireless charging transmission device 120 may further include a transistor 126. The transmission end control unit 124 of the communication control assembly 121 controls the driving circuit 123 according to the device charging information to provide the driving current to the coil 122 via the transistor 126. Further, the driving circuit 123 may transmit an on-off signal to the transistor 126 by means of the pulse width modulation information generated according to the device charging information by the transmission end control unit 124, so that the transistor 126 drives the coil 122 to generate the magnetic force. In the embodiment, the transistor 126 may be a metal oxide semiconductor field effect transistor (MOSFET), but the invention is not limited thereto.

Please particularly refer to FIGS. 1 and 2, the projection system 100 may further include a casing 101. The power supply device 110, the wireless charging transmission device 120, the projection system control assembly 130, the storage unit 140, and the optical system 150 are disposed at the casing 101. An outer surface of the casing 101 may be marked with a wireless charging area 102 corresponding to the wireless charging transmission device 120, which makes the user easy to use the wireless charging function.

The power supply device 110 can receive an external power P to at least supply power to the wireless charging transmission device 120, the projection system control assembly 130, and the optical system 150. The power supply device 110 may include a low voltage power supply unit 111. The low voltage power supply 111 is electrically connected to the wireless charging transmission device 120 to provide a low voltage direct current power for the driving circuit 123.

The projection system 100 may further include an operation command input unit 160. The operation command input unit 160 is electrically connected to the projection system control assembly 130 and provide the user operation information to projection system control assembly 130. The projection system control assembly 130 stores the user operation information in the storage unit 140. The operation command input unit 160 may be, for example, a remote controller or a button constructed on the casing 101 of the projection system 100.

The projection system control assembly 130 may further include a projection system control unit 131, a light source control unit 132, and an on screen display (OSD) processing unit 133. The projection system control unit 131 receives the user operation information from the operation command input unit 160 and stores the user operation information in the storage unit 140. The projection system control unit 131 turns on or turns off the wireless charging transmission device 120 according to the user operation information stored in the storage unit 140. The light source control unit 132 turns on or turns off the light source 151 according to the light source control information from the projection system control unit 131. The projection system control unit 131 controls the on screen display processing unit 133 to generate operation screen information. The light valve 152 converts the illumination beam L1 into the image beam L2 according to the operation screen information, so that the projection image includes the operation menus M1, M2, M3 related to the user operation information (as shown in FIGS. 3A to 3C). While the projection system control unit 131 turns on the wireless charging transmission device 120 according to the user operation information stored in the storage unit 140, the projection system control unit 131 controls the transmission end control unit 124, causing the transmission end control unit 124 to transmit the pulse width modulation (PWM) information to the driving circuit 123, so that the driving circuit 123 provides the driving current to the coil 122, and thereby charging the electronic device 200.

In addition, the projection system 100 may further include an image information input unit 170, and the projection system control assembly 130 may further include an image processing unit 134. The image information input unit 170 is disposed at the casing 101, and the image information input unit 170 receives input image information. The input image information may correspond to an input image. In an embodiment, the image information input unit 170 may transmit the input image information to the projection system control unit 131. The image processing unit 134 processes the input image information according to image processing information from the projection system control unit 131, and transmits generated input image projection information to the on screen display processing unit 133 to generate the operation screen information. The light valve 152 convert the illumination beam L1 to the image beam L2 according to the operation screen information. In another embodiment, the image information input unit 170 may transmit the input image information to the image processing unit 134. The image processing unit 134 processes the input image information according to the image processing information, and generates the input image projection information to the on screen display processing unit 133. The light valve 152 converts the illumination beam L1 into the image beam L2. Since the operation screen information generated by the on screen display processing unit 133 is related to the input image information, the projection image may include the input image corresponding to the input image projection information.

For example, when the on screen display processing unit 133 receives the command related to the user operation information from the projection system control unit 131, and simultaneously receives the command related to the input image, that is, the input image projection information, from the image processing unit 134, the operation screen information generated by the on screen display processing unit 133 include both the input image corresponding to the input image projection information and the operation menus M1, M2, M3 corresponding to the user operation information, so that the projection image includes the input image and the operation menus M1, M2, M3.

The light source 151 may be, for example, a solid state light source or a gas light source. The solid state light source is, for example, a diode module including a light-emitting diode or a laser diode, or a diode module bank array consisted of a plurality of diode modules, and the gas light source is, for example, a ultra high pressure lamp (UHP lamp), but the invention is not limited thereto. The light valve 152 may be a transmissive light valve or a reflective light valve. The transmissive light valve may be a transmissive liquid crystal panel, and the reflective light valve may be a digital micro-mirror device (DMD) or a liquid crystal on silicon panel (LCOS panel), but the invention is not limited thereto. The projection lens 153 includes, for example, a combination of one or more optical lenses having a non-zero doipter, such as a variety of combinations of non-planar lenses may be used, and the non-planar lenses include a biconcave lens, a biconvex lens, a concavo-convex lens, a convexo-concave lens, a plano-convex lens, and a plano-concave lens. In an embodiment, the projection lens 153 may also include a planar optical lens, but the invention is not limited thereto.

Please particularly refer to FIGS. 3 and 4, after the projection system 100 is connected to the power and is turned on (steps S101 and S102), the projection system control unit 131 of the projection system control assembly 130 controls the on screen display processing unit 113 to generate the operation screen information, so that the projection lens 153 of the optical system 150 projects the operation menus M1, M2, M3 of the wireless charging function on the projection screen 300. The operation menus M1, M2, M3 may be stored in the storage unit 140. The user may select and enter the operation menu M1 by the operation command input unit 160 (step S103), and by the operation such as checking, to turn on (i.e., operation menu M2) the wireless charging function or turn off (i.e., operation menu M3) the wireless charging function (steps S104, S105).

After the user selects to turn on the wireless charging function (step S104) and presses OK (step S106), the operation command input unit 160 generates first information and provides the first information as the user operation information to the projection system control unit 131. The projection system control unit 131 stores the first information in the storage unit 140 after receiving the first information. After the user selects to turn off the wireless charging function (step S105) and presses OK (step 106), the operation command input unit 160 generates second information and provides the second information as the user operation information to the projection system control unit 131, the projection system control unit 131 stores the second information in the storage unit 140. Accordingly, the projection system control unit 131 of the projection system control assembly 130 may turn on or turn off the wireless charging function according to the user operation information (first information or second information) stored in the storage unit 140. Further, when the stored user operation information is the first information, the projection system control assembly 130 (projection system control unit 131) executes a first operation command to turn on the wireless charging transmission device 120, so as to charge the electronic device 200. When the stored user operation information is the second information, the projection system control assembly 130 (projection system control unit 131) executes a second operation command to turn off the wireless charging transmission device 120, so as not to charge the electronic device 200. In this way, turning on or turning off the wireless charging transmission device 120 by the operation menus M1, M2, M3 of the wireless charging function. In one embodiment, the operation menus M2, M3 may be visually grayed out or not to present the selection of turning on or turning off the wireless charging function. In the embodiment, turning on the wireless charging function is presented by not graying out the projected operation menu M2 being not grayed out, and turning off the wireless charging function is presented by graying out the projected operation menu M2, but the invention is not limited thereto.

In addition, the operation menu M2 of the wireless charging function may further include operation options M21, M22 of being usable in the on state of the projection system 100 and in the standby state of the projection system 100 for the user to select. Accordingly, after the user selects to turn on the wireless charging function (step S104), the user may further select the operation option M21 of being usable in the on state of the projection system 100 or the operation option M22 of being usable in the standby state of the projection system 100, so as to turn on the wireless charging transmission device 120 when the projection system 100 is turned on or turn on the wireless charging transmission device 120 when the projection system 100 is on standby, to charge the electronic device 200. In the embodiment, the first information may include third information or fourth information, and the first operation command may include a third operation command and a fourth operation command. After the user sequentially selects to turn on the wireless charging function (step S104), selects the operation option M21 of being usable when the projection system 100 is turned on (step S108), and presses OK (step S106), the first information generated by the information input unit 160 includes the third information and provides the third information as the user operation information to the projection system control unit 131. After receiving the third information, the projection system control unit 131 stores the third information in the storage unit 140. After the user sequentially selects to turn on the wireless charging function (step S104), selects the operation option M22 of being usable when the projection system 100 is on standby (step S107), and presses OK (step S106), the first information generated by the information input unit 160 includes the fourth information and provides the fourth information as the user operation information to the projection system control unit 131. After receiving the fourth information, the projection system control unit 131 stores the fourth information in the storage unit 140. When the stored user operation information is the third information (the first information includes the third information), the projection system control assembly 130 (projection system control unit 131) executes the third operation command to turn on the wireless charging transmission device 120 when then projection system 100 is turned on, so as to charge the electronic device 200. When the stored user operation information is the fourth information (the first information includes the fourth information), the projection system control assembly 130 (projection system control unit 131) executes the fourth operation command to turn on the wireless charging transmission device 120 when the projection system 100 is on standby (i.e., the power supply device 110 supplies power for the projection system control assembly 130 and the projection system 100 is not turned on), so as to charge the electronic device 200. In one embodiment, the wireless charging function of the projection system 100 may be preset to be usable when the projection system 100 is turned on, but the invention is not limited thereto.

Figure 5:
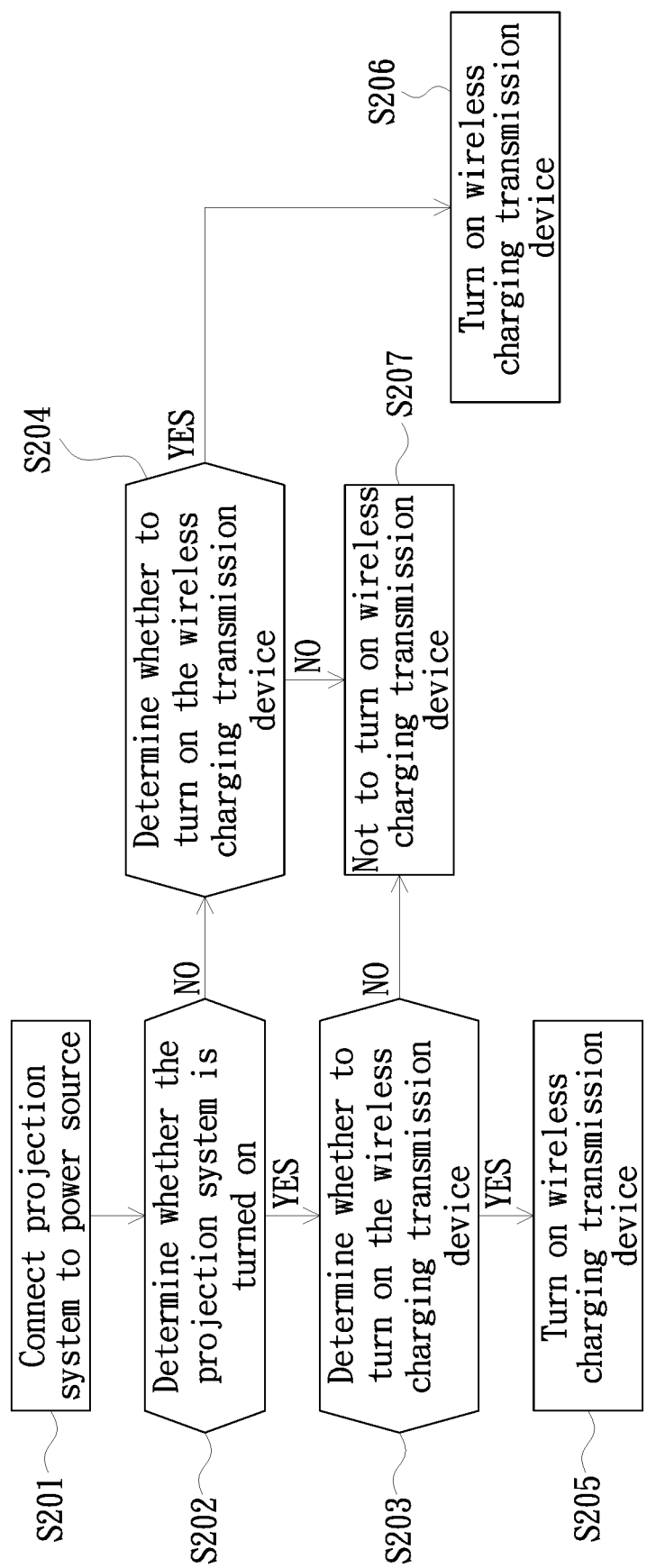
FIG. 5 is flow chart that a projection system in accordance with an embodiment of the invention turns on or off a wireless charging transmission device.

FIG. 5 is flow chart that a projection system 100 in accordance with an embodiment of the invention turns on or turns off a wireless charging transmission device 120. Please refer to both FIG. 1 and FIG. 5, after the user selects the wireless charging function of the projection system 100 or the projection system 100 follows the preset wireless charging function, and the projection system 100 (power supply device 110) also is connected to a power source (step S201), so that the power supply device 110 supplies power for the projection system control assembly 130. Successively, the projection system control unit 131 of the projection system control assembly 130 executes the determination that whether the projection system 100 is turned on (step S202), that is, whether the projection system 100 is to be changed from the standby state to the on state. Afterwards, the projection system control unit 131 of the projection system control assembly 130 executes the determination that whether to turn on the wireless charging transmission device 120 (steps S203, S204), to turn on the wireless charging transmission device 120 (steps S205, S206) or not to turn on the wireless charging transmission device 120 (step S207). In the embodiment, when the stored user operation information is the third information, the projection system control unit 131 of the projection system control assembly 130 executes the third operation command: determining whether the projection system 100 is turned on (step S202), that is, this determination is Yes and determining whether to turn on the wireless charging transmission device 120 (step S203), that is, this determination is Yes, and then turning on the wireless charging transmission device 120 (step S205), so as to charge the electronic device 200. When the stored user operation information is the fourth information, the projection system control unit 131 of the projection system control assembly 130 executes the fourth operation command: determining whether the projection system 100 is turned on (step S202), that is, this determination is Yes and determining whether to turn on the wireless charging transmission device 120 (step S204), that is, this determination is Yes, and then turning on the wireless charging transmission device 120 (step S206), so as to charge the electronic device 200. When the stored user operation information is the second information, the projection system control unit 131 of the projection system control assembly 130 executes the second operation command: determining whether the projection system 100 is turned on (step S202), that is, this determination is No and determining whether to turn on the wireless charging transmission device 120 (step S204), that is, this determination is No, or determining whether the projection system 100 is turned on (step S202), that is, this determination is Yes and determining whether to turn on the wireless charging transmission device 120 (step S203), that is, this determination is No, and then turning off the wireless charging transmission device 120 (step S207), so as not to charge the electronic device 200.

FIG. 6A is a schematic diagram of an operation menu M4 of a wireless charging tip message projected by a projection system 100 in accordance with an embodiment of the invention. FIG. 6B is a schematic diagram of an operation menu M5 of a wireless charging tip message projected by a projection system 100 in accordance with an embodiment of the invention after a user selects to turn on the wireless charging tip message. FIG. 6C is a schematic diagram of an operation menu M6 of a wireless charging tip message projected by a projection system 100 in accordance with an embodiment of the invention after a user selects to turn off the wireless charging tip message. Please refer to FIG. 1, FIG. 4, and FIGS. 6A to 6C, after the projection system 100 is connected to the power source and turned on (steps S101, S102), the projection system control unit 131 of the projection system control assembly 130 controls the on screen display processing unit 133 to generate the operation screen information. The light valve 152 converts the illumination beam L1 into the image beam L2, so that the projection lens 153 may project the operation menus M1, M2, M3 of the wireless charging function and the operation menus M4, M5, M6 of the wireless charging tip message. That is to say, the operation menus M1, M2, M3, M4, M5, M6 may include the operation menus M1, M2, M3 of the wireless charging function and the operation menus M4, M5, M6 of the wireless charging tip message. The user may select and enter the operation menu M4 of the wireless charging tip message through the operation command input unit 160, and select to turn on or turn off the charging tip of wireless charging through the operation menu M4 of the wireless charging tip message. In one embodiment, the operation menu M4 of the wireless charging tip message may be visually grayed out or not to present the selection of turning on or turning off the wireless charging tip message. In the embodiment, turning on the wireless charging tip message is presented by not graying out the projected operation menu M5, and turning off the wireless charging tip message is presented by graying out the projected operation menu M6, but the invention is not limited thereto. Further, the operation menus M4, M5, M6 of the wireless charging tip message may be arranged after the operation menus M1, M2, M2 of the wireless charging function. After the user selects the operation option M22 of being usable when the projection system 100 is on standby (step S107) or the operation option M21 of being usable when the projection system 100 is turned on (step S108), the operation menus M4, M5, M6 of the wireless charging tip message are provided for the user to select. The operation menus M4, M5, M6 of the wireless charging tip message may also be arranged to be provided before the operation menus M1, M2, M3 of the wireless charging function. Or, under the condition that the operation menus M1, M2, M3 of the wireless charging function is not provided, preset to turn on or turn off the wireless charging tip message.

For example, the operation menus M4, M5, M6 of the wireless charging tip message are arranged to be provided before the operation menus M1, M2, M3 of the wireless charging function, when the projection system 100 begins to wirelessly charge the electronic device 200 after the user selects to turn on the charging tip of wireless charging, the projection system 100 can provide the charging tip. The charging tip may be text, graphic in the projection image or tip light on the projection system 100. In the embodiment, after the user selects to turn on the wireless charging function (step S104), selects the operation option M21 of being usable when the projection system 100 is turned on (step S108), and selects to turn on the charging tip of wireless charging and presses OK (step S106), the operation command input unit 160 generates the third information and the fifth information, and provides the user operation information including the third information and the fifth information to the projection system control unit 131. The projection system control unit 131 stores the user operation information including the third information and the fifth information in the storage unit 140. When the user selects to turn on the wireless charging function (step S104), selects the operation option M22 of being usable when the projection system 100 is on standby (step S107), and selects to turn on the charging tip of wireless charging and presses OK (step S106), the operation command input unit 160 generates the fourth information and the fifth information, and provides the user operation information including the fourth information and the fifth information to the projection system control unit 131. The projection system control unit 131 stores the user operation information including the fourth information and the fifth information in the storage unit 140. In addition, the projection system 100 may include an indicating lamp. Accordingly, when the projection system 100 wirelessly charges the electronic device 200 while it is turned on, the projection system control unit 131 of the projection system control assembly 130 controls the on screen display processing unit 133 to execute the fifth operation command, so that the projection lens 153 projects the projection image including the charging tip (text or graphic). When the projection system 100 wirelessly charges the electronic device 200 while it is on standby, the projection system control unit 131 of the projection system control assembly 130 controls the on screen display processing unit 133 to execute the sixth operation command, so as to light up the indicating lamp as a tip (tip light).

Further, when the projection system 100 wirelessly charges the electronic device 200 while it is turned on, and the projection system control unit 131 of the projection system control assembly 130 controls the on screen display processing unit 133 to execute the fifth operation command allowing the projection lens 153 to project the projection image including the charging tip (text or graphic), the user may choose to turn off the charging tip from the operation command input unit 160, but the invention is not limited thereto. In one embodiment, the fifth operation command may be set to allow the charging tip to turn off after being projected on the screen for a period of time (for example, 3 seconds).

Figure 7:
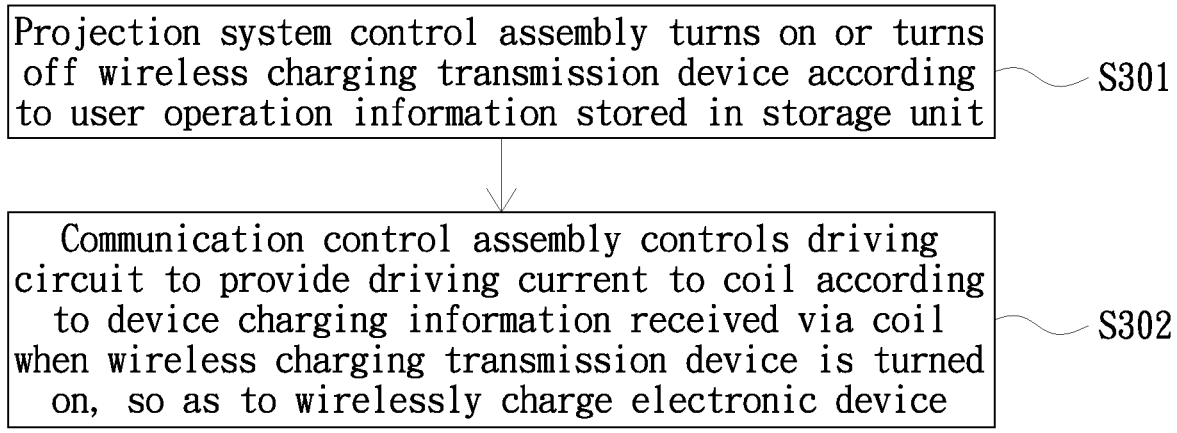
FIG. 7 is a flow chart of a wireless charging method of a projection system in accordance with an embodiment of the invention.

FIG. 7 is a flow chart of a wireless charging method of a projection system in accordance with an embodiment of the invention. Please refer to FIGS. 1 and 7, in the wireless charging method of the projection system in accordance with the embodiment of the invention, as illustrated in FIG. 1, the projection system 100 has the storage unit 140 for storing the user operation information and the operation menus related thereto. The light valve 152 is disposed on the transmission path of the illumination beam L1, and the projection system control assembly 130 controls the light valve 152 to convert the illumination beam L1 into the image beam L2, so that the projection image includes the input image and the operation menus M1, M2, M3, M4, M5, M6. The user operation information and the user menus M1, M2, M3, M4, M5, M6 related thereto are stored in the storage unit 140. The wireless charging method of the projection system 100 includes step S301: the projection system control assembly 130 turns on or turns off the wireless charging transmission device 120 according to the user operation information stored in the storage unit 140; and step S302: the communication control assembly 121 controls the driving circuit 123 to provide the driving current to the coil 122 according to the device charging information received via the coil 122 when the wireless charging transmission device 120 is turned on, so as to wirelessly charge the electronic device 200.

In the projection system and the wireless charging method of the projection system, the user can store the user operation information for turning on the wireless charging transmission device in the storage unit as required, so that the projection system turns on the wireless charging transmission device (i.e., setting the wireless charging transmission device on). After the wireless charging transmission device is turned on, the coil can receive the device charging information from the electronic device, and the communication control assembly can control the driving circuit to provide the driving current to the coil according to the device charging information received via the coil, thereby wirelessly charging the electronic device. Accordingly, when the projection system is used with the electronic device for presentations or viewing activities, if the power of the electronic device is insufficient and it is difficult to obtain a charging cable or an independent wireless charging device for charging the electronic device, the projection system can charge the electronic device in time through a wireless charging manner, thereby facilitating the presentations or viewing activities. It can be seen that, since the projection system control assembly turns on or turns off the wireless charging transmission device according to the user operation information stored in the storage unit, and the communication control assembly controls the driving circuit to provide the driving current to the coil according to the device charging information received via the coil when the wireless charging transmission device is turned on to wirelessly charge the electronic device, the projection system and the wireless charging method of the projection system of the invention can provide power for the electronic device in time to facilitate the presentations or viewing activities.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", "third", "fourth", "fifth", "sixth", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first information, the second information, the third information, the fourth information, the fifth information, the first operation command, the second operation command, the third operation command, the fourth operation command, the fifth operation command, and the sixth operation command are only used for distinguishing various elements and do not limit the number of the elements.

What is claimed is:

1. A projection system, comprising a power supply device, a wireless charging transmission device, a projection system control assembly, a storage unit, an optical system, and an operation command input unit, wherein:
   the operation command input unit is electrically connected to the projection system control assembly, the projection system control assembly is electrically connected to the wireless charging transmission device and the storage unit, the projection system control assembly is configured to turn on or turn off the wireless charging transmission device according to a user operation information provided by the operation command input unit of the projection system, wherein the user operation information is stored in the storage unit inside the projection system;
   the wireless charging transmission assembly comprises a communication control assembly, a coil, and a driving circuit, the driving circuit is electrically connected to the power supply device, and when the wireless charging transmission assembly is configured to turn on, the communication control assembly is configured to control the driving circuit to provide a driving current to the coil according to a device charging information received via the coil, so as to wirelessly charge an electronic device external to the projection system;
   the optical system is electrically connected to the projection system control assembly and comprises a light source, a light valve, and a projection lens, the light source is configured to provide an illumination beam, the light valve is disposed on a transmission path of the illumination beam, the projection system control assembly is configured to control the light valve to convert the illumination beam into an image beam, the projection lens is disposed on a transmission path of the image beam to project the image beam to be a projection image, wherein the projection image comprises a first operation menu, a second operation menu and a third operation menu related to the user operation information; wherein:
   the first operation menu comprises an operation option related to a wireless charging function; the second operation menu is correspondingly displayed when the operation option related to the wireless charging function is selected; the second operation menu comprises an operation option for turning on the wireless charging function and the second operation menu comprises an operation option for turning off the wireless charging function; the third operation menu is correspondingly displayed when the operation option for turning on the wireless charging function is selected; the third operation menu comprises an operation option for turning on the wireless charging function when the projection system is in an on state, and the third operation menu comprises an operation option for turning on the wireless charging function when the projection system is in a standby state; wherein the standby state of the projection system indicates that the power supply device supplies power to the projection system control assembly and the projection system is not turned on;

the power supply device is configured to supply power for the wireless charging transmission device, the projection system control assembly and the optical system; and the user operation information comprises one of a first information and a second information, the first information is related to the operation option for turning on the wireless charging function being selected, and the second information is related to the operation option for turning off the wireless charging function being selected;

when the user operation information comprises the first information, the projection system control assembly is configured to execute a first operation command to turn on the wireless charging transmission device, so as to charge the electronic device;

when the user operation information comprises the second information, the projection system control assembly is configured to execute a second operation command to turn off the wireless charging transmission device, so as not to charge the electronic device;

the first information further comprises one of a third information and a fourth information, the third information is related to the operation option for turning on the wireless charging function being selected when the projection system is in the on state, and the fourth information is related to the operation option for turning on the wireless charging function being selected when the projection system is in the standby state, and the first operation command comprises one of a third operation command and a fourth operation command;

when the first information comprises the third information, the projection system control assembly is configured to execute the third operation command to turn on the wireless charging transmission device while the projection system is turned on, so as to charge the electronic device; and when the first information comprises the fourth information, the projection system control assembly is configured to execute the fourth operation command to turn on the wireless charging transmission device while the projection system is in the standby state, so as to charge the electronic device.

2. The projection system according to claim 1, wherein:
the wireless charging transmission device further comprises a transistor; and
according to the device charging information, the communication control assembly is configured to control the driving circuit to provide the driving current to the coil via the transistor.

3. The projection system according to claim 1, wherein the communication control assembly is configured to demodulate the device charging information and generate a pulse width modulation information, the driving circuit is configured to provide the driving current to the coil according to the pulse width modulation information, so as to wirelessly charge the electronic device.

4. The projection system according to claim 1, wherein the power supply device is configured to receive an external power to supply power to at least the wireless charging transmission device, the projection system control assembly and the optical system, the power supply device comprises a low voltage power supply unit, the low voltage power supply unit is electrically connected to the wireless charging transmission device to provide low voltage direct current power for the driving circuit.

5. The projection system according to claim 1, wherein the projection system control assembly stores the user operation information in the storage unit.

6. The projection system according to claim 1, wherein the user operation information further comprises a fifth information, the fifth information is related to the operation of the user according to the operation menu, when the user operation information comprises the third information and the fifth information, the projection system control assembly is configured to execute a fifth operation command, so as to control the light valve to have an charging tip included in the projection image.

7. The projection system according to claim 1, wherein the user operation information further comprises a fifth information, the fifth information is related to the operation of the user according to the operation menu, and the projection system further comprises a indicating light, when the user operation information comprises the fourth information and the fifth information, the projection system control assembly is configured to execute a sixth operation command, so as to light the indicating light.

8. A wireless charging method of a projection system, the projection system comprising a power supply device, a wireless charging transmission device, a projection system control assembly, a storage unit, an optical system, and an operation command input unit, the operation command input unit is electrically connected to the projection system control assembly, the projection system control assembly electrically connected to the wireless charging transmission device, the storage unit and the optical system, the wireless charging transmission device comprising a communication control assembly, a coil, and a driving circuit, and the driving circuit electrically connected to the power supply device, the optical system comprising a light source, a light valve, and a projection lens, the light source providing an illumination beam, the light valve disposed on a transmission path of the illumination beam to convert the illumination beam into an image beam, the projection lens disposed on a transmission path of the image beam to project the image beam to be a projection image, the power supply device providing power for the wireless charging transmission device, the projection system control assembly, and the optical system, wherein the projection image comprises a first operation menu, a second operation menu, and a third operation menu related to a user operation information provided by the operation command input unit of the projection system, wherein the first operation menu comprises an operation option for the wireless charging function; the second operation menu is correspondingly displayed when the operation option of the wireless charging function is selected; the second operation menu comprises an operation option for turning on the wireless charging function, and the second operation menu comprises an operation option for turning off the wireless charging function; the third operation menu is correspondingly displayed when the operation option for turning on the wireless charging function is selected; the third operation menu comprises an operation option for turning on the wireless charging function when the projection system is in an on state, and the third operation menu comprises an operation option for turning on the wireless charging function when the projection system is in a standby state, wherein the standby state of the projection system indicates that the power supply device supplies power to the projection system control assembly and the projection system is not turned on; the user operation information, the first operation menu, the second operation menu, and the third operation menu are stored in the storage unit inside the projection system, and the wireless charging method of the projection system comprises:

configuring the projection system control assembly to turn on or turn off the wireless charging transmission device according to the user operation information stored in the storage unit;

when the wireless charging transmission assembly is turned on, configuring the communication control assembly to control the driving circuit to provide a driving current to the coil according to a device charging information received via the coil, so as to wirelessly charge an electronic device external to the projection system;

when the user operation information comprises the first information, configuring the projection system control assembly to execute a first operation command to turn on the wireless charging transmission device, so as to charge the electronic device;

when the user operation information comprises the second information, configuring the projection system control assembly to execute a second operation command to turn off the wireless charging transmission device, so as not to charge the electronic device, wherein the first information is related to the operation of the operation option for turning on the wireless charging function being selected, and the second information is related to the operation of the operation option for turning off the wireless charging function being selected, wherein the first information further comprises one of a third information and a fourth information, the third information is related to the operation option for turning on the wireless charging function being selected when the projection system is in the on state, and the fourth information is related to the operation option for turning on the wireless charging function being selected when the projection system is in the standby state, and the first operation command comprises one of a third operation command and a fourth operation command, wherein:

when the first information comprises the third information, the projection system control assembly is configured to execute the third operation command to turn on the wireless charging transmission device while the projection system is turned on, so as to charge the electronic device; and when the first information comprises the fourth information, the projection system control assembly is configured to execute the fourth operation command to turn on the wireless charging transmission device while the projection system is in the standby state, so as to charge the electronic device.

9. The wireless charging method of the projection system according to claim 8, wherein the user operation information further comprises a fifth information, the fifth information is related to the operation of the user according to the operation menu, and the wireless charging method of the projection system further comprises:

when the user operation information comprises the third information and the fifth information, the projection system control assembly is configured to execute a fifth operation command, so as to control the light valve to have a charging tip included in the projection image.

10. The wireless charging method of the projection system according to claim 8, wherein the user operation information further comprises a fifth information, the fifth information is related to the operation of the user according to the operation menu, and the projection system further comprises an indicating light, the wireless charging method of the projection system further comprises:

when the user operation information comprises the fourth information and the fifth information, the projection system control assembly is configured to execute a sixth operation command, so as to light the indicating light.

11. The projection system according to claim 1, wherein the operation command input unit is a remote controller or a button constructed on a casing of the projection system.

* * * * *